Figure 1:
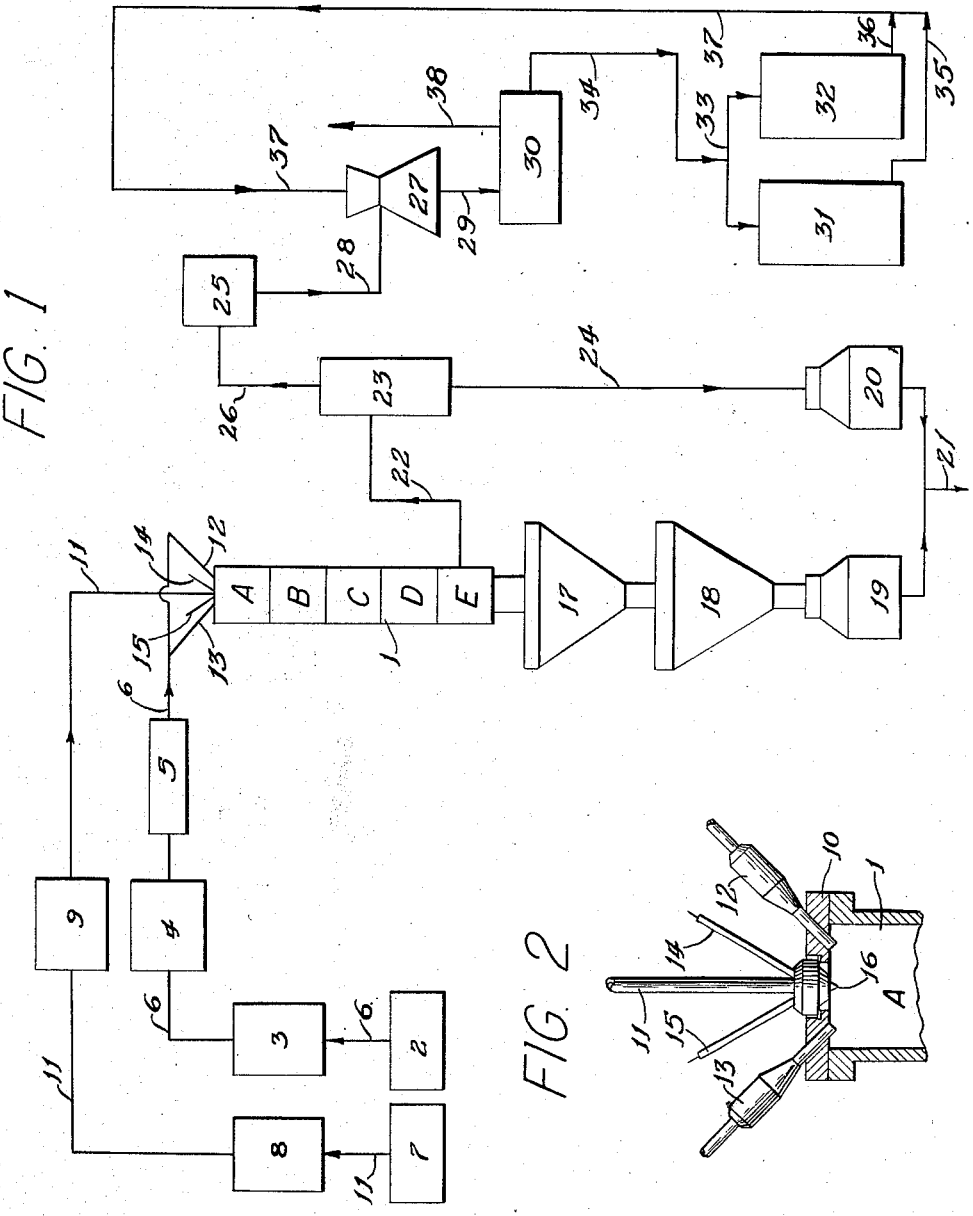

Aug. 4, 1959 W. E. SHAW ET AL 2,898,187
PRODUCTION OF URANIUM TETRAFLUORIDE
Filed Dec. 23, 1953

INVENTORS
William E. Shaw
BY: Robert M. Spenceley
Frederick M. Tedzel

Roland A. Anderson
ATTORNEY

United States Patent Office 2,898,187
Patented Aug. 4, 1959

2,898,187

PRODUCTION OF URANIUM TETRAFLUORIDE

William E. Shaw, Robert M. Spenceley, and Frederick M. Teetzel, Hamilton, Ohio, assignors to the United States of America as represented by the United States Atomic Energy Commission Application December 23, 1953, Serial No. 400,149

4 Claims. (Cl. 23—14.5)

This invention deals with the production of uranium tetrafluoride, and in particular with the reduction of uranium hexafluoride with hydrogen.

The reduction of uranium hexafluoride with hydrogen has been carried out heretofore in a reactor vessel, the walls of which were heated to the necessary temperature. The reaction took place in part on the heated reactor walls and some product was deposited thereon. Although the reduction of uranium hexafluoride is an exothermic reaction, a high activation energy is necessary for its initiation. For this reason a temperature of at least 900 to 1000° F. is necessary for the reduction.

This process used heretofore has a number of disadvantages. In the first place, large quantities of pure hydrogen are necessary which require the installation of an expensive electrolytic hydrogen plant. The reaction, as has been mentioned above, takes place on the walls of the reactor vessel and the uranium tetrafluoride deposits thereon. Due to the relatively high temperatures of the walls a portion of the tetrafluoride is mostly deposited in molten form or, as this phenomenon is usually called, slagging occurs, and after the process has been operated for a certain period of time the slag often bridges the walls and the reactor vessel gradually becomes clogged; the feed of uranium hexafluoride then stops and discontinuation of the operation becomes necessary. Moreover, the slag is mostly very hard and therefore difficult to remove.

It has also been tried to obtain the energy necessary for initiating the reaction, instead of by heating the walls to an excessively high temperature, by admixing fluorine gas with the gaseous reagents. In an exothermic reaction the fluorine combines with hydrogen to form hydrogen fluoride. By this procedure overheating is more easily avoided than by heating the walls of the reactor and slagging may be prevented. However, the necessity of the fluorine makes the process rather costly and the extra hydrogen fluoride formed is an undesirable by-product.

It is an object of this invention to provide a process for the reduction of uranium hexafluoride with hydrogen to form uranium tetrafluoride in which less heat has to be added through the reactor walls.

It is another object of this invention to provide a process for the reduction of uranium hexafluoride with hydrogen to form uranium tetrafluoride in which the addition of fluorine is not necessary and the quantity of hydrogen fluoride obtained is thereby reduced to a minimum.

It is another object of this invention to provide a process for the reduction of uranium hexafluoride with hydrogen to form uranium tetrafluoride in which little or no slagging takes place.

It is still another object of this invention to provide a process for the reduction of uranium hexafluoride with hydrogen to form uranium tetrafluoride which may be operated in a continuous manner.

It is a further object of this invention to provide a process for the reduction of uranium hexafluoride with hydrogen to form uranium tetrafluoride which operates with increased equipment efficiency as compared with the processes used heretofore.

It is finally also an object of this invention to provide a process for the reduction of uranium hexafluoride with hydrogen to form uranium tetrafluoride in which the tetrafluoride is obtained in the form of a powdered product of relatively high density.

These and other objects are accomplished by dissociating molecular hydrogen, allowing the hydrogen atoms to recombine into molecules whereby heat is released in the reaction zone where the recombination takes place, and feeding uranium hexafluoride gas into said reaction zone whereby the hexafluorine is reduced and powdered uranium tetrafluoride is formed.

Atomic hydrogen may be produced by any methods known to those skilled in the art. The inventors found the use of an automatic atomic hydrogen welding head very satisfactory for the production of atomic hydrogen. The size of the arc was dependent upon voltage, while change in current between 20 and 45 amperes had no noticeable effect thereon. A voltage setting of 80 volts and a power input of 3.6 kw. produced an arc about ½ inch high, ¾ inch wide and ⅛ inch thick when the points of the electrodes were about 3/16 inch apart. The distance of the electrode points was adjustable.

Instead of using commercial hydrogen for the process a mixture of hydrogen and nitrogen obtained by "cracking" ammonia in an ammonia dissociator may be used as the hydrogen source.

In either case, introduction of the uranium hexafluoride was made at the point where the atomic hydrogen recombined, in other words where the maximum amount of heat was available. Temperatures up to about 2500° F. were measured in this reaction zone.

In order to obtain complete reduction it was found necessary to use an excess of hydrogen. A mole ratio of about 3:1 for $H_2:UF_6$ gave satisfactory results when a flow rate for the uranium hexafluoride between 3 and 8.5 lbs./min. was used.

The reactor was a cylindrical container, 8 inches in diameter, made of Monel nickel metal tube, at the top of which the hydrogen dissociating equipment was arranged. Thermocouples were placed at various points of the cylindrical container for measuring the temperatures. In the case of using an electric arc for the production of atomic hydrogen, the temperature was found to be highest about 3 inches directly below the arc; there, or approximately there, is the point where the uranium hexafluoride was introduced and where the bulk of the reduction reaction took place. As has been stated above, the temperature in this reaction zone proper usually is about 2500° F., while below this point the temperature ranges between about 1200 and 900° F.

Figure 2:
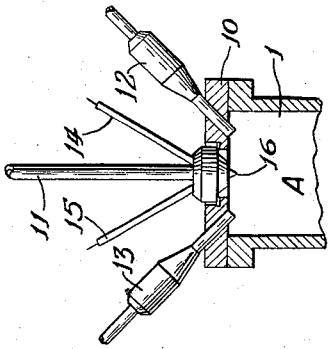

The equipment used for the process of this invention normally comprises three main systems, the system for feeding the reagents, the reaction system and the system for treating the off-gases. In the accompanying drawing a diagrammatic illustration of one preferred apparatus for carrying out the process of this invention is illustrated; Figure 1 shows the complete apparatus while Figure 2 shows, on an enlarged scale, the arc-producing device in a cross-sectional view.

Referring to these drawings in detail, the reference numeral 1 designates a reactor in which the reduction of the uranium hexafluoride by the hydrogen takes place. This reactor, in the instance shown, was made of a Monel pipe 17 feet, 3 inches long and 8 inches in diameter. Five heating units (not shown) provide for some heat throughout the reactor to create zones A, B, C, D and E. While normally the temperature to which zones A and B are heated is between 1000 and 1200° F. and that of zones C, D and E is about 900° F., the temperature in zone A, where the heat is released by the combination of hydrogen atoms, is raised to approximately 2500° F. The bulk of the reaction takes place in this zone A.

A vapor chest 2, heated to about 250° F., vaporizes uranium hexafluoride which is guided through steam-traced pipes 6 which connect the vapor chest with a surge tank 3, serving as a reservoir and maintaining the uranium hexafluoride vapor at about 15 p.s.i.g., the surge tank with a flow control 4, and the flow control with a preheater 5; the preheater has a temperature of approximately 750° F. In the steam-traced pipes 6 the uranium hexafluoride is heated to approximately 200° F. in order to prevent freezing. The uranium hexafluoride is then introduced into the top of the reactor by means of a double nozzle or a concentric ring nozzle designated by the reference numerals 12 and 13.

A hydrogen manifold 7 furnishes the hydrogen necessary; it guides it through a surge tank 8 and a flow control 9 by means of connecting pipe line 11 which terminates in the center of a lid 10 on top of the reactor. Pipe line 11 is not heated. Two electrodes 14 and 15, preferably made of tungsten, are also arranged in the top lid of the reactor; these electrodes are adjustable for the purpose of regulating the length of the arc. The reference numeral 16 indicates the arc. The angle of the nozzle or nozzles 12, 13 is suitably adjusted so that the current of uranium hexafluoride leaving 12, 13 meets the hydrogen current about 2 to 3 inches below the arc 16 (Figure 2) which is about the zone where the hydrogen atoms recombine and the greatest amount of heat is available.

At the bottom of the reactor two weigh hoppers 17 and 18 are arranged which receive the uranium tetrafluoride powder produced. The product is collected by a product receiver 19. The off-gas from the reactor, which mainly consists of hydrogen fluoride but also some uranium tetrafluoride and excess of hydrogen gas, is passed via a pipe 22 into a filter 23 where the bulk of the entrained uranium tetrafluoride is deposited; from there the deposited uranium tetrafluoride is passed through pipe 24 into a second product receiver 20 which is connected with the first product receiver 19 by means of pipe 21. The uranium tetrafluoride from receivers 19 and 20 can thus be combined for further processing. The off-gas leaving filter 23 is then passed through pipe 26 into a second filter for further complete removal of uranium tetrafluoride.

The filters for uranium tetrafluoride may be of any type known to those skilled in the art. For instance, they may be of the dry cyclone type or they may be electrostatic precipitators; in the instance shown in the drawing, the filter 23 was an Adams filter and the filter 25 a Monel-hair backup filter. The Adams filter used in this instance contained seven porous carbon tubes. The uranium tetrafluoride was periodically blown off this filter by means of a nitrogen current.

The gas leaving the second filter 25 then mainly consists of hydrogen and hydrogen fluoride. This gas is led through pipe 28 into a Venturi-type scrubber 27 into which a potassium hydroxide solution is fed by means of pipe 37. The potassium hydroxide solution is derived from either of two potassium hydroxide reservoirs 31 and 32 which are connected in parallel and which are used alternately, thereby allowing continuous operation. While the potassium hydroxide is replenished in one reservoir, the other one is in operation for supplying the potassium hydroxide solution.

The potassium hydroxide solution absorbs the hydrogen fluoride, forming potassium fluoride. The preferred concentration of the potassium hydroxide solution is about 45%; it is used preferably until the KOH concentration has been reduced to about 5%.

The potassium hydroxide solution, which after use also contains potassium fluoride, and the hydrogen gas are then introduced into a waste tank 30 from which the entrained hydrogen is allowed to escape through a pipe 38 which, in turn, is connected with a burner (not shown) in which the hydrogen is burned. The potassium hydroxide solution is then circulated through pipes 34 and 33, either through tank 31 and pipe line 35 or through tank 32 and pipe line 36, into pipe line 37, which reintroduces the potassium hydroxide into the scrubber 27.

A lime solution was also found suitable for neutralization and absorption of the hydrogen fluoride.

The entire assembly is preferably kept under superatmospheric pressure in order to prevent inleakage of air which might bring about the production of an oxyfluoride or uranium oxide. A pressure in the reactor of 0.75 p.s.i.g. has been found suitable for this purpose.

The temperature of the off-gas is a good indication of the completeness of the reaction. It was found that if the temperature of the off-gas was below about 210° F., the reaction was complete, while a temperature above 210° F. indicated a partial reaction only. The average temperature of the off-gas of a complete reaction is between 190 and 200° F.

In the following, an example is given which shows the operativeness of the process of this invention.

*Example*

In an ammonia dissociator 2000 cu. ft. of dissociated ammonia was produced per hour. This "cracked" ammonia was introduced into the top of a reactor and dissociated; it was then contacted with uranium hexafluoride in a reactor of the type described above. The molal ratio of the hydrogen to uranium hexafluoride was 3:1 and the flow rate of the uranium hexafluoride was 3.72 lbs./min.

The uranium tetrafluoride obtained had a bulk density of 3.7 g./cc. It contained 75.33% of tetravalent uranium and had a total uranium content of 75.80%; 0.1% of the product was carbon. In view of the fact that chemically pure uranium tetrafluoride contains 75.8% uranium, the purity of the product obtained must be considered excellent.

The process of this invention is also useful for converting uranium oxide to uranium tetrafluoride via the uranium hexafluoride. Uranium tetrafluoride is a valuable starting material for the production of metallic uranium by the bomb process in which the tetrafluoride is reduced by calcium or magnesium. The high density of the product obtained by this process is a desirable feature, since it allows higher charges in the bomb.

It will be understood that this invention is not to be limited to the details given herein but that it may be modified within the scope of the appended claims. It will in particular be understood, for instance, that the process of this invention may be carried out by other devices than those shown in the specification by way of example and that the dissociated hydrogen may be produced by any method known to those skilled in the art.

What is claimed is:

1. A method of producing uranium tetrafluoride from uranium hexafluoride by reduction with hydrogen, comprising dissociating molecular hydrogen, allowing the hydrogen atoms to recombine into molecules whereby heat is released in a reaction zone where the recombination takes place, and feeding uranium hexafluoride gas into said reaction zone whereby the uranium hexafluoride is reduced and powdered uranium tetrafluoride is formed.

2. The process of claim 1 wherein the $H_2:UF_6$ molal ratio is about 3:1 and the flow rate of the uranium hexafluoride ranges between 3 and 8.5 lbs./min.

3. The process of claim 2 wherein the temperature used for initiation of the reaction is about 2500° F.

4. The process of claim 1 wherein atomic hydrogen is produced by guiding hydrogen gas over an electrical arc.

References Cited in the file of this patent

UNITED STATES PATENTS 1,046,043     Weintraub _____ Dec. 3, 1912

OTHER REFERENCES

Ruff et al.: Zeitschrift für Anorganische Chemie, vol. 72, pages 63–84 (1911).